(12) United States Patent
Xie et al.

(10) Patent No.: US 11,186,204 B2
(45) Date of Patent: Nov. 30, 2021

(54) VEHICLE SEATING ARRANGEMENT HAVING REMOTE FOLD-FLAT CAPABILITIES

(71) Applicant: Ford Global Technologies, LLC, Dearborn, MI (US)

(72) Inventors: Haofei Xie, Canton, MI (US); Frank Glenn Walega, Dearborn, MI (US); Harish Muppalla, Farmington Hills, MI (US); Christopher Sean Rumaczyk, Oak Park, MI (US); Rob Persad, Superior Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 135 days.

(21) Appl. No.: 16/793,564

(22) Filed: Feb. 18, 2020

(65) Prior Publication Data

US 2021/0253000 A1 Aug. 19, 2021

(51) Int. Cl.
*B60N 2/20* (2006.01)
*B60N 2/01* (2006.01)
*B60N 2/90* (2018.01)
*B60N 2/02* (2006.01)

(52) U.S. Cl.
CPC ............. *B60N 2/206* (2013.01); *B60N 2/01* (2013.01); *B60N 2/0296* (2013.01); *B60N 2/919* (2018.02); *B60N 2002/948* (2018.02); *B60N 2002/952* (2018.02)

(58) Field of Classification Search
CPC .......... B60N 2/01; B60N 2/0296; B60N 2/20; B60N 2/206; B60N 2/22; B60N 2/919; B60N 2/3011; B60N 2002/948; B60N 2002/952
See application file for complete search history.

(56) References Cited

U.S. PATENT DOCUMENTS

| 4,653,807 | A | * | 3/1987 | Hirose | B60N 2/2352 248/430 |
| 5,570,931 | A | * | 11/1996 | Kargilis | B60N 2/206 248/429 |
| 5,582,453 | A | * | 12/1996 | Leuchtmann | B60N 2/366 296/65.09 |
| 6,139,104 | A | * | 10/2000 | Brewer | B60N 2/20 297/341 |

(Continued)

*Primary Examiner* — James M Ference
(74) *Attorney, Agent, or Firm* — David Coppiellie; Price Heneveld LLP

(57) ABSTRACT

A vehicle seating arrangement includes a first seating assembly, a second seating assembly, and a third seating assembly. The second seating assembly is adjacent to the first seating assembly. Each of the first, second, and third seating assemblies include a seat and a seatback. The seatbacks are pivotably coupled to their respective seats such that the seatbacks are each pivotable between a use position and a forward-dumped position. A remote control is positioned on at least one of the first seating assembly, the second seating assembly, and the third seating assembly. Actuation of the remote control in a first direction transitions the seatback of the first seating assembly toward the forward-dumped position. Actuation of the remote control in a second direction transitions the seatback of at least one of the second and third seating assemblies toward the forward-dumped position.

20 Claims, 5 Drawing Sheets

(56) References Cited

U.S. PATENT DOCUMENTS

| | | | | |
|---|---|---|---|---|
| 6,328,381 B1* | 12/2001 | Smuk | | B60N 2/206 |
| | | | | 297/365 |
| 6,663,180 B2* | 12/2003 | LeTournoux | | B60N 2/206 |
| | | | | 297/378.12 |
| 7,021,716 B2* | 4/2006 | Persad | | B60N 2/12 |
| | | | | 297/378.12 |
| 7,472,963 B2* | 1/2009 | Jeong | | B60N 2/0296 |
| | | | | 297/463.1 |
| 7,762,604 B1* | 7/2010 | Lindsay | | B60N 2/01583 |
| | | | | 296/64 |
| 7,862,121 B2* | 1/2011 | Ishijima | | B60N 2/22 |
| | | | | 297/367 R |
| 7,938,490 B2* | 5/2011 | Ishijima | | B60N 2/165 |
| | | | | 297/358 |
| 7,959,229 B2* | 6/2011 | Ishijima | | B60N 2/1615 |
| | | | | 297/358 |
| 8,162,404 B2* | 4/2012 | Ueda | | B60N 2/165 |
| | | | | 297/463.1 |
| 8,336,942 B2* | 12/2012 | Yamashita | | B60N 2/0155 |
| | | | | 296/65.03 |
| 8,960,800 B2* | 2/2015 | Champ | | B60N 2/235 |
| | | | | 297/378.1 |
| 9,022,477 B2* | 5/2015 | Pleskot | | B60N 2/06 |
| | | | | 297/361.1 |
| 9,132,752 B2* | 9/2015 | Pleskot | | B60N 2/1615 |
| 9,168,850 B2* | 10/2015 | Meszaros | | B60N 2/3056 |
| 9,216,667 B1* | 12/2015 | Izawa | | B60N 2/6009 |
| 9,744,883 B2* | 8/2017 | Nakagawa | | B60N 2/1615 |
| 9,821,690 B2* | 11/2017 | Nakagawa | | B60N 2/90 |
| 9,937,824 B2* | 4/2018 | Pereira | | B60N 2/3011 |
| 10,059,240 B2* | 8/2018 | Mitsumoto | | B60N 2/16 |
| 10,065,539 B2* | 9/2018 | Osterhoff | | B60N 2/3011 |
| 10,065,548 B2* | 9/2018 | Dunn | | B60N 2/305 |
| 10,112,506 B2* | 10/2018 | Izawa | | B60N 2/168 |
| 10,179,528 B2* | 1/2019 | Minegishi | | B60N 2/6009 |
| 10,464,453 B2* | 11/2019 | Brown | | B60N 2/20 |
| 10,493,865 B2* | 12/2019 | Ellison | | B60N 2/0228 |
| 10,787,097 B2* | 9/2020 | Bodke | | B60N 2/3013 |
| 2004/0217638 A1* | 11/2004 | Shao | | B60N 2/20 |
| | | | | 297/378.14 |
| 2007/0138854 A1* | 6/2007 | Paing | | B60N 2/2352 |
| | | | | 297/378.12 |
| 2009/0058158 A1* | 3/2009 | Sobieski | | B60N 2/22 |
| | | | | 297/338 |
| 2009/0243325 A1* | 10/2009 | Villeminey | | B60N 3/004 |
| | | | | 296/65.09 |
| 2010/0090515 A1* | 4/2010 | Yamazaki | | B60N 2/90 |
| | | | | 297/463.1 |
| 2010/0225151 A1* | 9/2010 | Michalak | | B60N 2/0232 |
| | | | | 297/344.1 |
| 2010/0237673 A1* | 9/2010 | Lindsay | | B60N 2/2245 |
| | | | | 297/378.13 |
| 2011/0260518 A1* | 10/2011 | Scheurer, II | | B60N 2/3065 |
| | | | | 297/378.12 |
| 2012/0133187 A1* | 5/2012 | Ootsuka | | B60N 2/065 |
| | | | | 297/354.12 |
| 2013/0162000 A1* | 6/2013 | Kume | | B60N 2/90 |
| | | | | 297/463.1 |
| 2014/0183920 A1* | 7/2014 | Hage-Hassan | | B60N 2/36 |
| | | | | 297/378.1 |
| 2014/0265418 A1* | 9/2014 | Thota | | B60N 2/36 |
| | | | | 296/65.16 |
| 2015/0175040 A1* | 6/2015 | Meszaros | | B60N 2/3045 |
| | | | | 297/188.01 |
| 2015/0183344 A1* | 7/2015 | Kienke | | B60N 2/224 |
| | | | | 297/344.1 |
| 2017/0036570 A1* | 2/2017 | Espinosa | | B60N 2/2362 |
| 2017/0240070 A1* | 8/2017 | Susko | | B60N 2/4214 |
| 2017/0297458 A1* | 10/2017 | Pereira | | B60N 2/01583 |
| 2018/0015849 A1* | 1/2018 | Mahadik | | B60N 2/10 |
| 2018/0093591 A1* | 4/2018 | Osterhoff | | B60N 2/206 |
| 2018/0141470 A1* | 5/2018 | Lee | | B60N 2/3056 |
| 2019/0047442 A1* | 2/2019 | Enderich | | B60N 2/0244 |
| 2019/0232821 A1* | 8/2019 | Ellison | | B60N 2/36 |
| 2019/0366886 A1* | 12/2019 | Sivaraj | | B60N 2/3065 |
| 2021/0253000 A1* | 8/2021 | Xie | | B60N 2/206 |

* cited by examiner

VEHICLE SEATING ARRANGEMENT HAVING REMOTE FOLD-FLAT CAPABILITIES

FIELD OF THE DISCLOSURE

The present disclosure generally relates to vehicles. More specifically, the present disclosure relates to vehicle seating arrangements with fold-flat capabilities.

BACKGROUND OF THE INVENTION

Vehicles have been provided with a plurality of vehicle seating assemblies. Reconfiguration of the vehicle seating assemblies may be desirable to some consumers to accommodate various uses of the vehicle. Accordingly, additional solutions are needed that aid in the reconfiguration of a cabin of the vehicle.

SUMMARY OF THE INVENTION

According to a first aspect of the present disclosure, a vehicle seating arrangement includes a first seating assembly, a second seating assembly, and a third seating assembly. The second seating assembly is adjacent to the first seating assembly. The third seating assembly is adjacent to at least one of the first seating assembly and the second seating assembly. Each of the first, second, and third seating assemblies include a seat and a seatback. The seatbacks of each of the first, second, and third seating assemblies are pivotably coupled to their respective seats such that the seatbacks are each pivotable between a use position and a forward-dumped position. The vehicle seating arrangement also includes a remote control positioned on at least one of the first seating assembly, the second seating assembly, and the third seating assembly. Actuation of the remote control in a first direction transitions the seatback of the first seating assembly from the use position toward the forward-dumped position. Actuation of the remote control in a second direction transitions the seatback of at least one of the second and third seating assemblies from the use position toward the forward-dumped position.

Embodiments of the first aspect of the present disclosure can include any one or a combination of the following features:

- a linkage assembly that extends from the remote control to a first lock assembly that is coupled to the first seating assembly and from the remote control to a second lock assembly that is coupled to the third seating assembly;
- actuation of the remote control in the first direction disengages the first lock assembly;
- the linkage assembly includes a first cable that extends between the remote control and the first lock assembly;
- actuation of the remote control in the first direction increases a tension of the first cable such that a force applied to the remote control is transmitted into a force experienced by the first lock assembly, wherein the force experienced by the first lock assembly actuates the first lock assembly from a locked position to an unlocked position;
- actuation of the remote control in the second direction disengages the second lock assembly;
- the linkage assembly includes a second cable that extends between the remote control and the second lock assembly;
- actuation of the remote control in the second direction increases a tension of the second cable such that a force applied to the remote control is transmitted into a force experienced by the second lock assembly, wherein the force experienced by the second lock assembly actuates the second lock assembly from a locked position to an unlocked position;
- a first lock assembly provided at a junction between the seat and the seatback of the first seating assembly, and a second lock assembly provided at a junction between the seat and the seatback of the third seating assembly;
- the first lock assembly includes a first actuator that actuates the first lock assembly from a locked position to an unlocked position, and the second lock assembly includes a second actuator that actuates the second lock assembly from a locked position to an unlocked position;
- the first actuator is electrically coupled to the remote control, wherein actuation of the remote control in the first direction transmits a signal to the first actuator that results in the first actuator actuating the first lock assembly from the locked position to the unlocked position; and
- the second actuator is electrically coupled to the remote control, wherein actuation of the remote control in the second direction transmits a signal to the second actuator that results in the second actuator actuating the second lock assembly from the locked position to the unlocked position.

According to a second aspect of the present disclosure, a vehicle seating arrangement includes a first seating assembly, a second seating assembly, and a third seating assembly. The second seating assembly is adjacent to the first seating assembly. The third seating assembly is adjacent to the second seating assembly and positioned such that the second seating assembly is between the first and third seating assemblies. Each of the first, second, and third seating assemblies includes a seat and a seatback. The seatbacks of each of the first, second, and third seating assemblies are pivotably coupled to their respective seats such that the seatbacks are each pivotable between a use position and a forward-dumped position. A first remote control is positioned on the first seating assembly. Actuation of the first remote control in a first direction transitions the seatback of the first seating assembly from the use position toward the forward-dumped position. Actuation of the first remote control in a second direction transitions the seatback of at least one of the second and third seating assemblies from the use position toward the forward-dumped position. A second remote control is positioned on the third seating assembly. Actuation of the second remote control in a first direction transitions the seatback of at least one of the second and third seating assemblies from the use position toward the forward-dumped position. Actuation of the second remote control in a second direction transitions the seatback of the first seating assembly from the use position toward the forward-dumped position.

Embodiments of the second aspect of the present disclosure can include any one or a combination of the following features:

- a first linkage assembly that extends from the first remote control to a first lock assembly, the first lock assembly being coupled to the first seating assembly, wherein the first linkage assembly extends from the first remote control to a second lock assembly, the second lock assembly being coupled to the third seating assembly, and a second linkage assembly that extends from the second remote control to the first lock assembly, wherein the second linkage assembly extends from the second remote control to the second lock assembly;

the first lock assembly is disengaged by either actuation of the first remote control in the first direction or actuation of the second remote control in the second direction;

the second lock assembly is disengaged by either actuation of the first remote control in the second direction or actuation of the second remote control in the first direction;

a first lock assembly provided at a junction between the seat and the seatback of the first seating assembly, and a second lock assembly provided at a junction between the seat and the seatback of the third seating assembly;

the first lock assembly includes a first actuator that actuates the first lock assembly from a locked position to an unlocked position, wherein the second lock assembly includes a second actuator that actuates the second lock assembly from a locked position to an unlocked position;

the first actuator is electrically coupled to the first and second remote controls, wherein actuation of the first remote control in the first direction transmits a signal to the first actuator that results in the first actuator actuating the first lock assembly from the locked position to the unlocked position, wherein actuation of the second remote control in the second direction transmits a signal to the first actuator that results in the first actuator actuating the first lock assembly from the locked position to the unlocked position; and the second actuator is electrically coupled to the first and second remote controls, wherein actuation of the first remote control in the second direction transmits a signal to the second actuator that results in the second actuator actuating the second lock assembly from the locked position to the unlocked position, wherein actuation of the second remote control in the first direction transmits a signal to the second actuator that results in the second actuator actuating the second lock assembly from the locked position to the unlocked position.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1A:
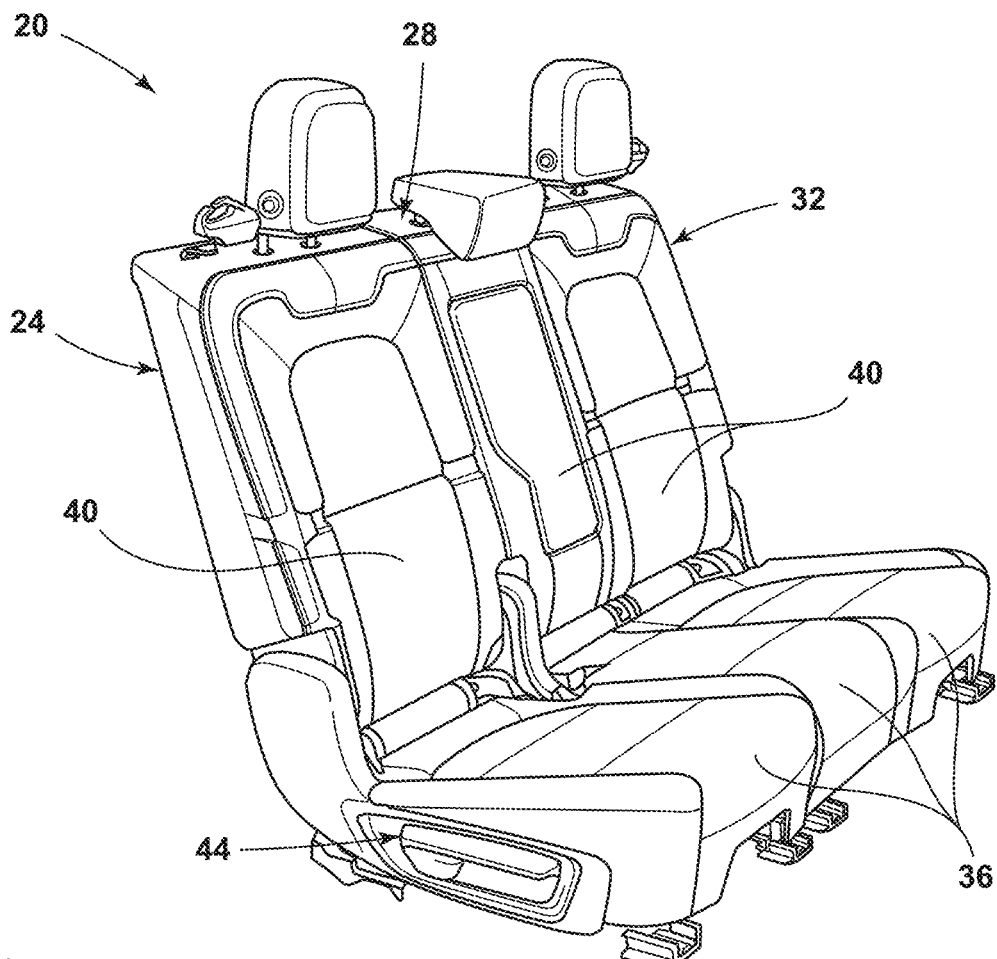
FIG. 1A is a side perspective view of a vehicle seating arrangement, illustrating first, second, and third seating assemblies each in a use position, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle seating arrangement. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-6, a vehicle seating arrangement 20 includes a first seating assembly 24, a second seating assembly 28, and a third seating assembly 32. The second seating assembly 28 may be adjacent to the first seating assembly 24 in a lateral or longitudinal direction. The third seating assembly 32 may be adjacent to the second seating assembly 28 in the lateral or longitudinal direction. In some examples, the third seating assembly 32 is positioned such that the second seating assembly 28 is between the first and third seating assemblies 24, 32. Each of the first, second, and third seating assemblies 24, 28, 32 include a seat 36 and a seatback 40. The seatbacks 40 of each of the first, second, and third seating assemblies 24, 28, 32 are pivotably coupled to their respective seats 36 such that the seatbacks 40 are each pivotable between a use position (FIG. 1A) and a forward-dumped position (FIGS. 2A and 3A). The seatbacks 40 of the second and third seating assemblies 28, 32 may pivot as a single unit relative to their respective seats 36. In such an example, the vehicle seating arrangement 20 may be referred to as a 60/40-split seating arrangement or a 60/40-split bench seating arrangement. Alternatively, the seatbacks 40 of the first, second, and third seating assemblies 24, 28, 32 may each pivot independently of one another relative to their respective seats 36. In such an example, the vehicle seating arrangement 20 may be referred to as a 40/20/40-split seating arrangement or a 40/20/40-split bench seating arrangement. In some examples, the second seating assembly 28 may be omitted such that the first and third seating assemblies 24, 32 are immediately adjacent to one another (e.g., in a third row seating arrangement) with the seatbacks 40 of the first and third seating assemblies 24, 32 being independently pivotable from one another relative to their respective seats 36. In such an example, the vehicle seating arrangement 20 may be referred to as a 50/50-split seating arrangement or a 50/50-split bench seating arrangement. The vehicle seating arrangement 20 includes a remote control 44 positioned on at least one of the first seating assembly 24, the second seating assembly 28, and the third seating assembly 32. Actuation of the remote control 44 in a first direction (FIGS. 2A and 2B) transitions the seatback 40 of the first seating assembly 24, which may be a near-side seating assembly, from the use position to the forward-dumped position. Actuation of the remote control 44 in a second direction (FIGS. 3A and 3B) transitions the seatbacks 40 of the second and/or third seating assemblies 28, 32, which may be a middle and/or a far-side seating assembly, from the use position to the forward-dumped position.

Figure 4:
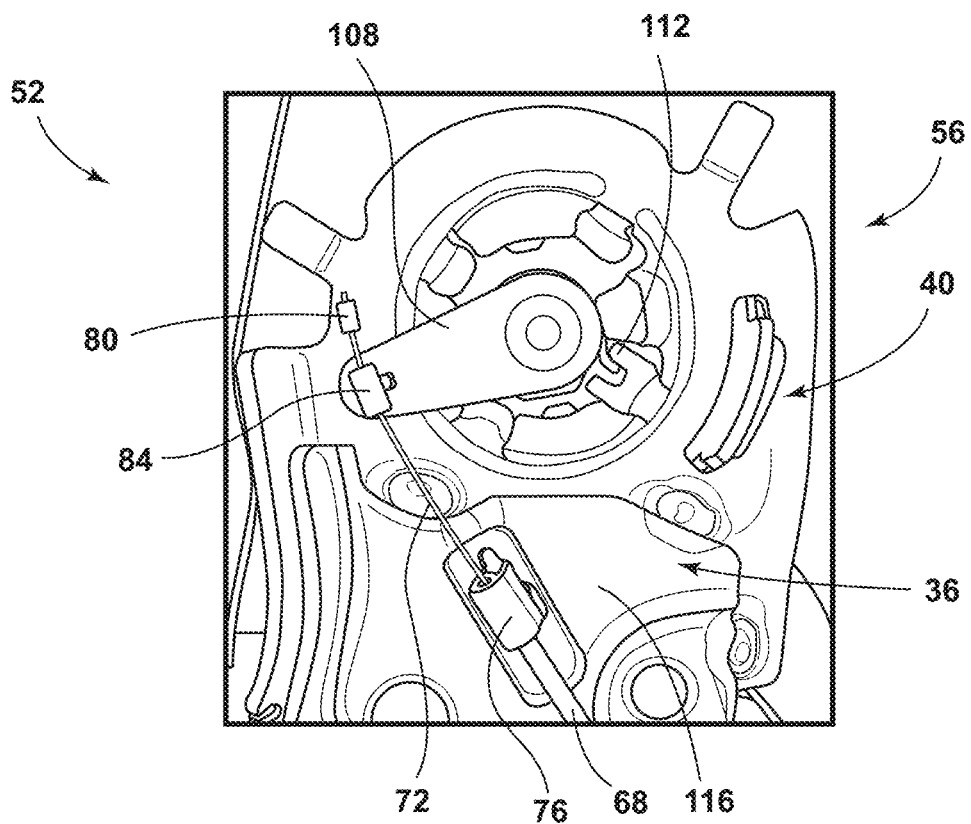
FIG. 4 is a side perspective view of a lock assembly in a locked position, according to one example.
Figure 5:
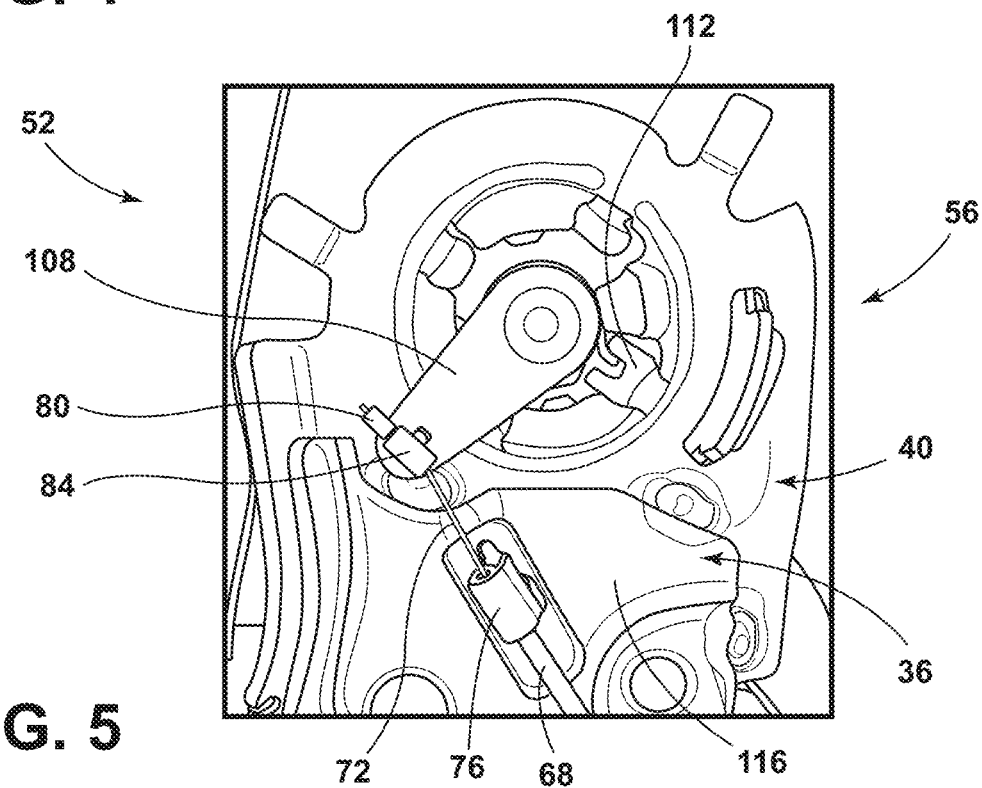
FIG. 5 is a side perspective view of the lock assembly in an unlocked position, according to one example.

Referring again to FIGS. 1A and 1B, the remote control 44 is depicted separated from the vehicle seating arrangement 20. A linkage assembly 48 can extend from the remote control 44 to a first lock assembly 52 (see FIGS. 4 and 5) that is coupled to the first seating assembly 24. The linkage assembly 48 also extends from the remote control 44 to a second lock assembly 56 that is coupled to the third seating assembly 32 (see FIGS. 4 and 5). In various examples, the first and second lock assemblies 52, 56 may be identical. Accordingly, a single lock assembly is depicted in FIGS. 4 and 5. Aspects of the first lock assembly 52 or the second lock assembly 56 may therefore apply to the other of the first lock assembly 52 or the second lock assembly 56. The linkage assembly 48 can include a first portion 60 and a second portion 64. The first portion 60 may extend between the remote control 44 and the first lock assembly 52. The second portion 64 may extend between the remote control 44 and the second lock assembly 56. Each of the first and second portions 60, 64 of the linkage assembly 48 can include a conduit 68 and a cable 72. The cable 72 passes through the conduit 68 and the cable 72 can move or slide relative to the conduit 68 through an interior aperture that is provided through, or defined by, the conduit 68.

Figure 1B:
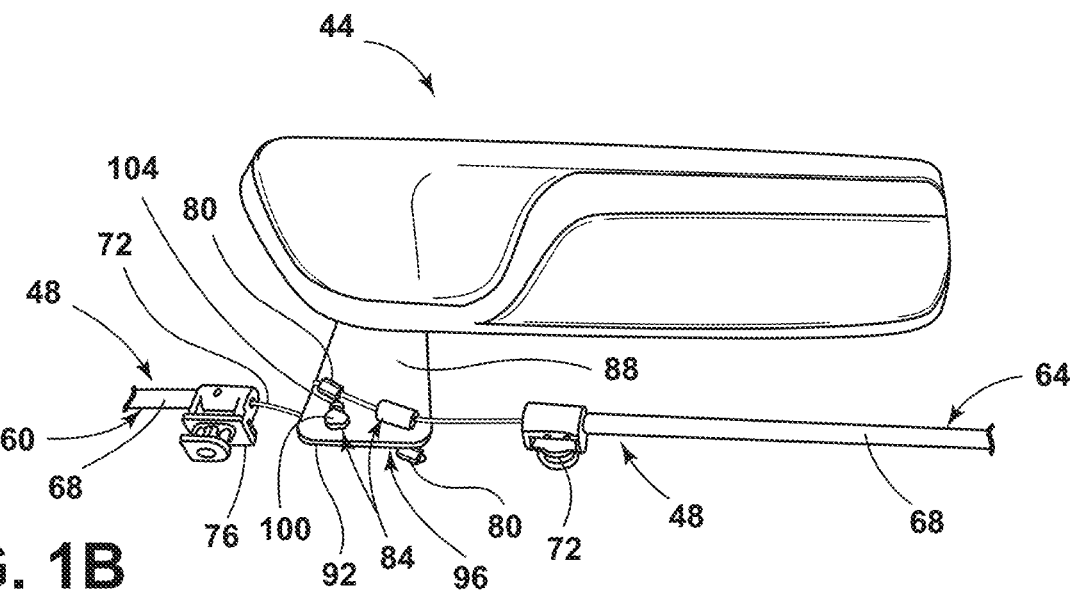
FIG. 1B is a side perspective view of a remote control of the vehicle seating arrangement in a neutral position, according to one example.

Referring further to FIGS. 1A and 1B, an anchor 76 may be provided at either end of the conduit 68. The anchors 76 can retain the conduit 68 in a desired position such that actuation of the remote control 44 may induce motion of the associated cable 72 relative to the conduit 68. The conduit 68 may protect the cable 72 from experiencing as much abrasion as would otherwise be experienced in the absence of the conduit 68. The conduit 68 may facilitate mounting of the linkage assembly 48 in a manner that does not impede the ability of the cable 72 to transmit force from the remote control 44 to the first lock assembly 52 and/or the second lock assembly 56. The anchors 76 may engage with a portion of the vehicle seating arrangement 20 to retain the anchors 76 in their desired position. The cable 72 of the linkage assembly 48 is provided with endcaps 80 proximate to terminal ends of the cable 72. The cable 72 may pass through a guide or retention feature 84 that is coupled to, or integrated with, a movable component of the vehicle seating arrangement 20. For example, one of the retention features 84 may be provided on a portion of the remote control 44 for the first portion 60, one of the retention features 84 may be provided on the remote control 44 for the second portion 64, one of the retention features 84 may be provided on a portion of the first lock assembly 52, and/or one of the retention features 84 may be provided on a portion of the second lock assembly 56. The engagement of the retention feature 84 with the cable 72 may position the retention feature 84 between the anchor 76 of the conduit 68 and the endcap 80 of the associated cable 72.

Referring still further to FIGS. 1A and 1B, in a neutral position, as depicted in FIGS. 1A and 1B, a degree of slack may be provided in the cable 72 such that the remote control 44 does not immediately act upon the cable 72 upon displacement of the remote control 44 from the neutral position.

The remote control 44 may be provided with one of the retention features 84 on an outboard side 88 and an inboard side 92 of a support arm 96. The retention feature 84 positioned on the inboard side 92 of the support arm 96, which cannot be readily seen in FIG. 1B, may be identical to the retention feature 84 depicted on the outboard side 88 of the support arm 96. In some examples, the retention feature 84 may include a locking portion 100 that is inserted into an aperture 104 that is defined by the support arm 96 of the remote control 44. Upon insertion of the locking portion 100 of the retention feature 84 into the aperture 104, the retention feature 84 may be rotated, such that an interference fit is established between the locking portion 100 of the retention feature 84 and the support arm 96. Accordingly, the retention feature 84 may extend through the support arm 96 and may be removably coupled to the support arm 96. The retention feature 84 may therefore be retained in position by a compression force established between the retention feature 84 and the support arm 96 due to the sandwiching of the support arm 96 between two portions of the retention feature 84 and/or an interference fit between the retention feature 84, the locking portion 100, and the aperture 104 in the support arm 96.

Figure 2A:
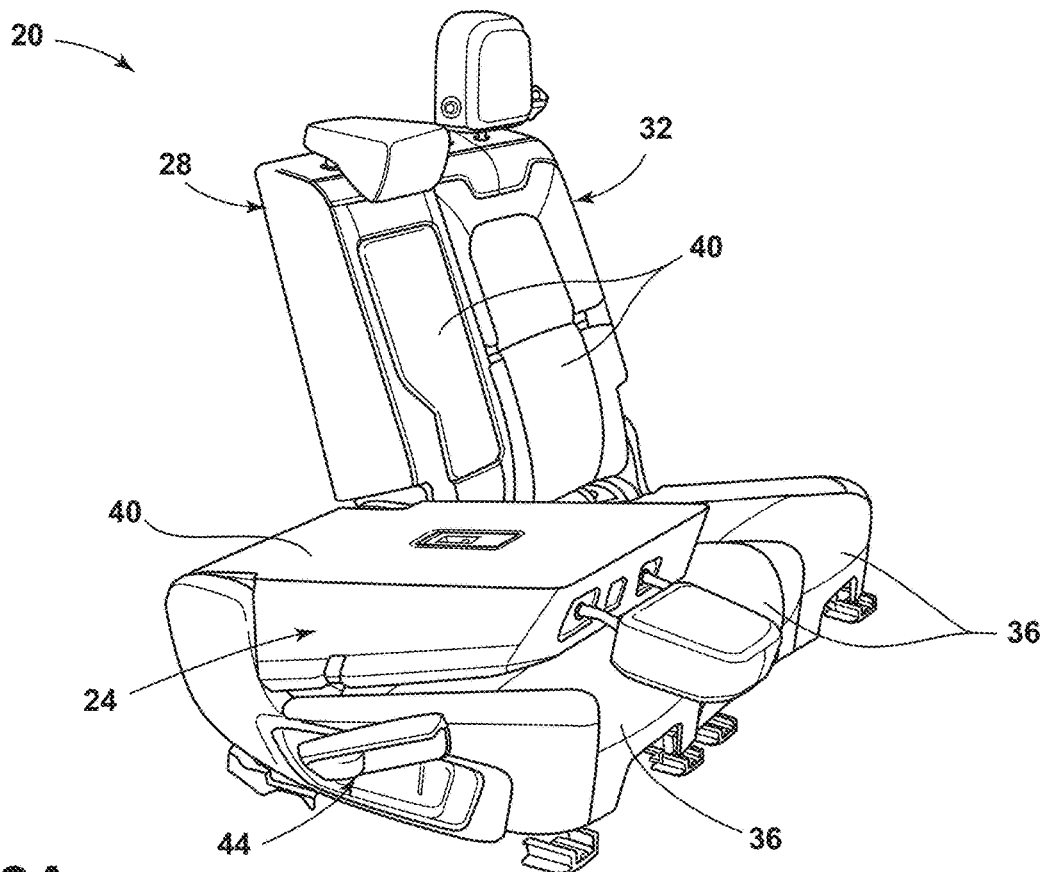
FIG. 2A is a side perspective view of the vehicle seating arrangement, illustrating the first seating assembly in a forward-dumped position, according to one example.
Figure 2B:
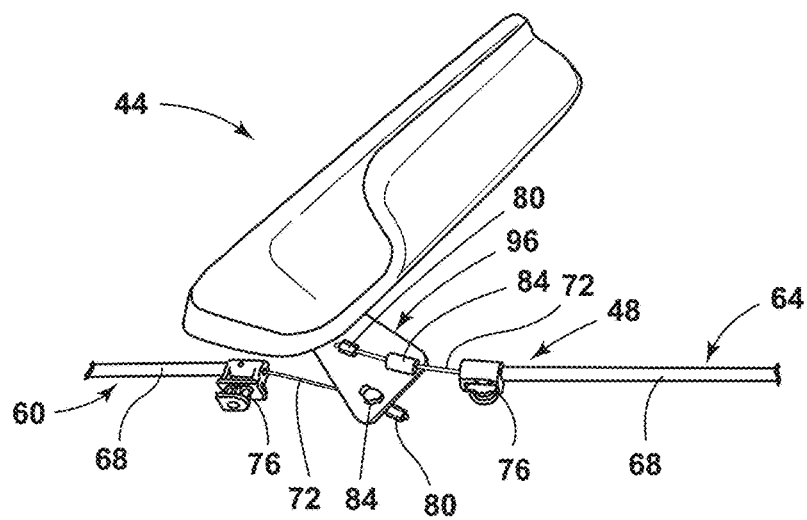
FIG. 2B is a side perspective view of the remote control of the vehicle seating arrangement having been actuated in a first direction, according to one example.

Referring now to FIGS. 2A and 2B, the remote control 44 is depicted as having been actuated in the first direction. The first direction of actuation of the remote control 44 may place the remote control 44 in an inclined position. Upon actuation of the remote control 44 in the first direction, the first lock assembly 52 may disengage and permit rotation of the seatback 40 of the first seating assembly 24 from the use position toward the forward-dumped position. When the first seating assembly 24 is in the forward-dumped position, the seatback 40 has been rotated to be generally parallel with the seat 36 and may present a rearward surface of the seatback 40 of the first seating assembly 24 as being in a generally horizontal position. As the remote control 44 is actuated toward the first direction, a force that is applied to the remote control 44 toward the first direction may be imparted to the linkage assembly 48, by way of the support arm 96 of the remote control 44. Actuation of the remote control 44 in the first direction can decrease a distance between the retention feature 84 and the endcap 80 of the first portion 60 of the linkage assembly 48. Continued actuation of the remote control 44 in the first direction results in physical contact between the endcap(s) 80 and the retention feature(s) 84 that are associated with the first portion 60 of the linkage assembly 48. Accordingly, as the remote control 44 is continued along its actuation in the first direction, the cable 72 is pulled through the conduit 68 and acts upon the first lock assembly 52 of the first seating assembly 24 (see FIGS. 4 and 5). The cable 72 of the first portion 60 of the linkage assembly 48 may be referred to as a first cable. Accordingly, the linkage assembly 48 includes the first cable 72 that extends between the remote control 44 and the first lock assembly 52. Actuation of the remote control 44 in the first direction may increase a tension on the first cable 72 such that a force applied to the remote control 44 is transmitted into a force experienced by the first lock assembly 52. The force experienced by the first lock assembly 52 may actuate the first lock assembly 52 from a locked position (see FIG. 4) to an unlocked position (see FIG. 5).

Figure 3A:
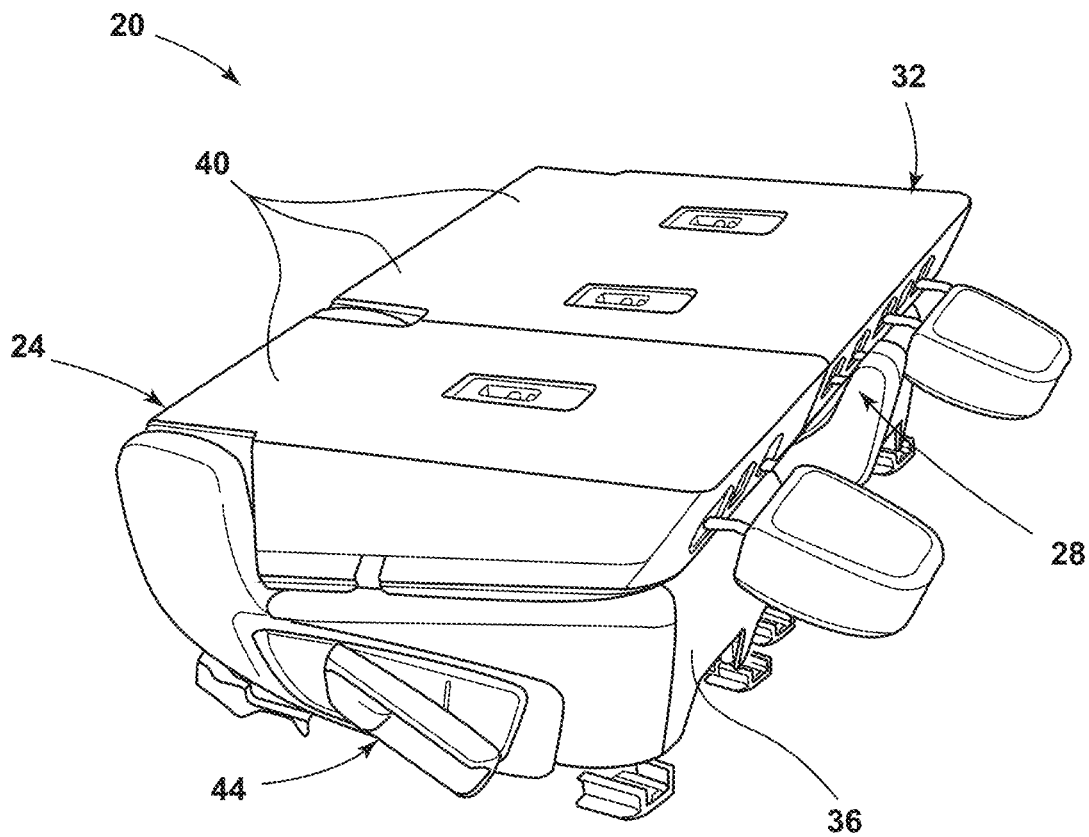
FIG. 3A is a side perspective view of the vehicle seating arrangement, illustrating the first, second, and third seating assemblies in the forward-dumped position, according to one example.
Figure 3B:
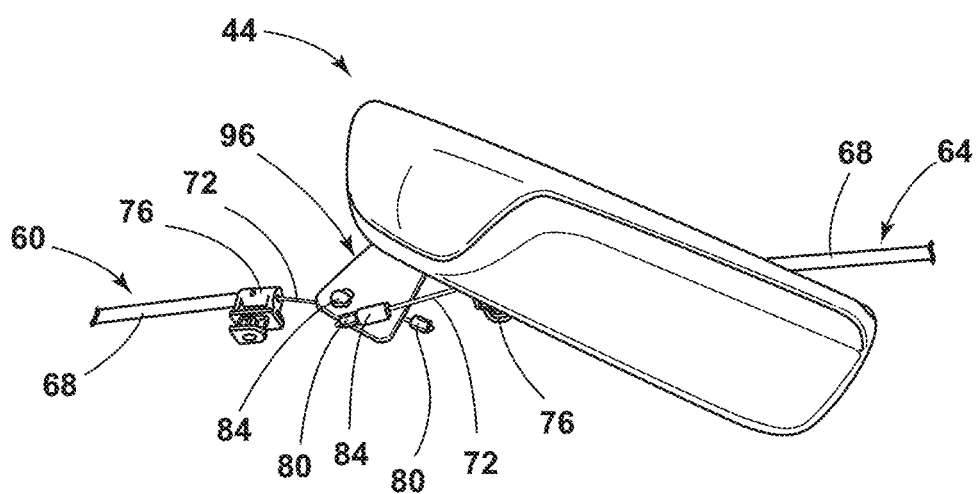
FIG. 3B is a side perspective view of the remote control of the vehicle seating arrangement having been actuated in a second direction, according to one example.

Referring to FIGS. 3A and 3B, the remote control 44 is depicted as having been actuated in the second direction. The second direction of actuation of the remote control 44 may place the remote control 44 in a declined position. Upon actuation of the remote control 44 in the second direction, the second lock assembly 56 may disengage and permit rotation of the seatback 40 of the second seating assembly 28 and/or the third seating assembly 32 from the use position toward the forward-dumped position. When the second seating assembly 28 and/or third seating assembly 32 is in the forward-dumped position, the seatback(s) 40 have been rotated to be generally parallel with the seat(s) 36 and may present a rearward surface of the seatback(s) 40 of the second seating assembly 28 and/or the third seating assembly 32 as being in a generally horizontal position. As the remote control 44 is actuated toward the second direction, a force that is applied to the remote control 44 toward the second direction may be imparted to the linkage assembly 48, by way of the support arm 96 of the remote control 44. Actuation of the remote control 44 in the second direction can decrease a distance between the retention feature(s) 84 and the endcap(s) 80 of the second portion 64 of the linkage assembly 48. Continued actuation of the remote control 44 in the second direction results in physical contact between the endcap(s) 80 and the retention feature(s) 84 that are associated with the second portion 64 of the linkage assembly 48. Accordingly, as the remote control 44 is continued along its actuation in the second direction, the cable 72 is pulled through the conduit 68 and acts upon the second lock assembly 56 of the second seating assembly 28 and/or third seating assembly 32 (see FIGS. 4 and 5). The cable 72 of the second portion 64 of the linkage assembly 48 may be referred to as a second cable. Accordingly, the linkage assembly 48 includes the second cable 72 that extends between the remote control 44 and the second lock assembly 56. Actuation of the remote control 44 in the second direction may increase a tension on the second cable 72 such that a force applied to the remote control 44 is transmitted into a force experienced by the second lock assembly 56. The force experienced by the second lock assembly 56 may actuate the second lock assembly 56 from a locked position (see FIG. 4) to an unlocked position (see FIG. 5).

Referring to FIGS. 1A-3B, while the vehicle seating arrangement 20 is depicted with the first, second, and third seating assemblies 24, 28, 32 in a laterally side-by-side arrangement, the present disclosure is not so limited. Rather, the first, second, and/or third seating assemblies 24, 28, 32 may be arranged in a longitudinal direction such that at least one of the first, second, and third seating assemblies 24, 28, 32 are positioned in different rows (e.g., first row and second row, second row and third row, etc.). For example, the first seating assembly 24 may be positioned in a second row within the cabin of the vehicle and the second and/or third seating assemblies 28, 32 may be positioned in a third row within the cabin of the vehicle. Accordingly, actuation of the remote control 44 in the first direction may transition the first seating assembly 24 from the use position toward the forward-dumped position and actuation of the remote control 44 in the second direction may transition the second and/or third seating assemblies 28, 32 from the use position toward the forward-dumped position. In such an example, the linkage assembly 48 may be routed from the remote control 44 to the floor or a trim component of the vehicle and extended to the second and/or third seating assemblies 28, 32 in a manner that minimizes visibility of the linkage assembly 48 to a user. While specifically outlined for an example where a remote control 44 on a second row seating assembly is utilized to transition one or more third row seating assemblies, one of skill in the art will recognize that similar arrangements apply to alternative arrangements where the remote control 44 available in a given row is utilized to transition a seating assembly positioned in a different row. In various examples, the remote control 44 may be actuated in one of the first direction and the second direction to varying extents to effect the transition from the use position toward the forward-dumped position for the first, second, and/or third seating assemblies 24, 28, 32. For example, the remote control 44 on the first seating assembly 24 may be actuated in the first direction to a first extent to transition the first seating assembly 24 from the use position toward the forward-dumped position. In such an example, the remote control 44 on the first seating assembly 24 may be actuated in the first direction to a second extent to transition the second and/or third seating assemblies 28, 32 from the use position toward the forward-dumped position, with the second extend being a greater distance from the neutral position that the first extent. In such an example, a prevailing directionality of the force applied to the remote control 44 may differ through actuation to the first extent and through actuation to the second extent, accordingly, the first extent may represent the first direction of actuation and the second extent may represent the second direction of actuation.

Referring now to FIGS. 4 and 5, the first and second lock assemblies 52, 56 are depicted, according to one example. As stated above, the first and second lock assemblies 52, 56 may be identical. Accordingly, while a single lock assembly is depicted in FIGS. 4 and 5, one of skill in the art will recognize the applicability of the lock assembly for use in multiple locations on the vehicle seating arrangement 20 to affect transition of the first, second, and/or third seating assemblies 24, 28, 32 from the use position to the forward-dumped position. The first lock assembly 52 may be provided at a junction between the seat 36 and the seatback 40 of the first seating assembly 24. Similarly, the second lock assembly 56 may be provided at a junction between the seat 36 and the seatback 40 of the second seating assembly 28 and/or at a junction between the seat 36 and the seatback 40 the third seating assembly 32. Alternatively, the first and/or second lock assemblies 52, 56 may be positioned proximate to an upper portion of the seatback 40 of the corresponding seating assembly (e.g., first seating assembly 24, second seating assembly 28, and/or third seating assembly 32). Positioning the first and/or second lock assemblies 52, 56 proximate to the upper portion of the seatback 40 may be beneficial in examples where the vehicle seating arrangement 20 is built into the body of the vehicle (e.g., sedans). Accordingly, the first and/or second lock assemblies 52, 56 may be positioned proximate a C-pillar of the vehicle and configured to release the corresponding seatback 40 upon actuation of the remote control 44 in a given direction. In such examples, a biasing member may be provided (e.g., at the junction between the seat 36 and the seatback 40) that biases the seatback 40 toward the forward-dumped position, such that, upon release of the first and/or second lock assembly 52, 56, the corresponding seatback 40 is urged toward the forward-dumped position. The first lock assembly 52 and the second lock assembly 56 may each be provided with an actuator 108 that is utilized to actuate the corresponding lock assembly from a locked position (FIG. 4) to an unlocked position (FIG. 5). The actuator 108 on the first lock assembly 52 may be referred to as a first actuator and the actuator 108 on the second lock assembly 56 may be referred to as a second actuator. As with the portions of the linkage assembly 48 that are positioned proximate to the remote control 44, the cable 72 may be provided with a degree of slack proximate to the actuator 108, which may aid in preventing unintentional release of the first and second lock assemblies 52, 56. The cable 72 is provided with one of the endcaps 80 that is arranged in a similar manner to the portion of the linkage assembly 48 that is positioned proximate to the remote control 44. As with the portion of the linkage assembly 48 that is positioned proximate to the remote control 44, one of the retention features 84 may be provided on the actuator 108 and the cable 72 can pass through the retention feature 84 with the endcap 80 being provided proximate to a terminal end of the cable 72. Upon actuation of the remote control 44, the force applied to the remote control 44 is transmitted into motion of the cable 72 that ultimately brings the endcap 80 and the retention feature 84 into physical contact with one another. Further actuation of the remote control 44 results in the force transmitted along the cable 72 actuating the actuator 108 toward the unlocked position, depicted in FIG. 5. Accordingly, rotational motion imparted to the remote control 44 can be translated into linear motion of the cable 72, which is in turn translated into rotational motion of the actuator 108 of the corresponding lock assembly (e.g., the first lock assembly 52 or the second lock assembly 56). The first and second lock assemblies 52, 56 may be biased toward the forward-dumped position with the actuator 108 acting as a physical impediment to the transition of the first seating assembly 24, the second seating assembly 28, and/or the third seating assembly 32 from the use position to the forward-dumped position. In various examples, this biasing of the vehicle seating arrangement 20 toward the forward-dumped position may be accomplished with a biasing member (e.g., a clock spring 112). Actuating the actuator 108 from the locked position to the unlocked position may therefore remove the physical impediment provided by the actuator 108 such that the biasing force applied by the biasing member may result in actuation or initiation of actuation of the seatback 40 toward the forward-dumped position of the first seating assembly 24, the second seating assembly 28, and/or the third seating assembly 32. As with the portion of the linkage assembly 48 that is positioned proximate to the remote control 44, the portion of the linkage assembly 48 that is positioned proximate to the first lock assembly 52 and/or the second lock assembly 56 may be provided with one of the anchors 76 such that the conduit 68 may be retained in a desired position. For example, the anchor 76 that is positioned proximate to the first lock assembly 52 and/or the second lock assembly 56 may engage with a bracket 116 of the seat 36. The bracket 116 of the seat 36 may remain stationary independent of a position of the seatback 40 of the corresponding seating assembly.

Figure 6:
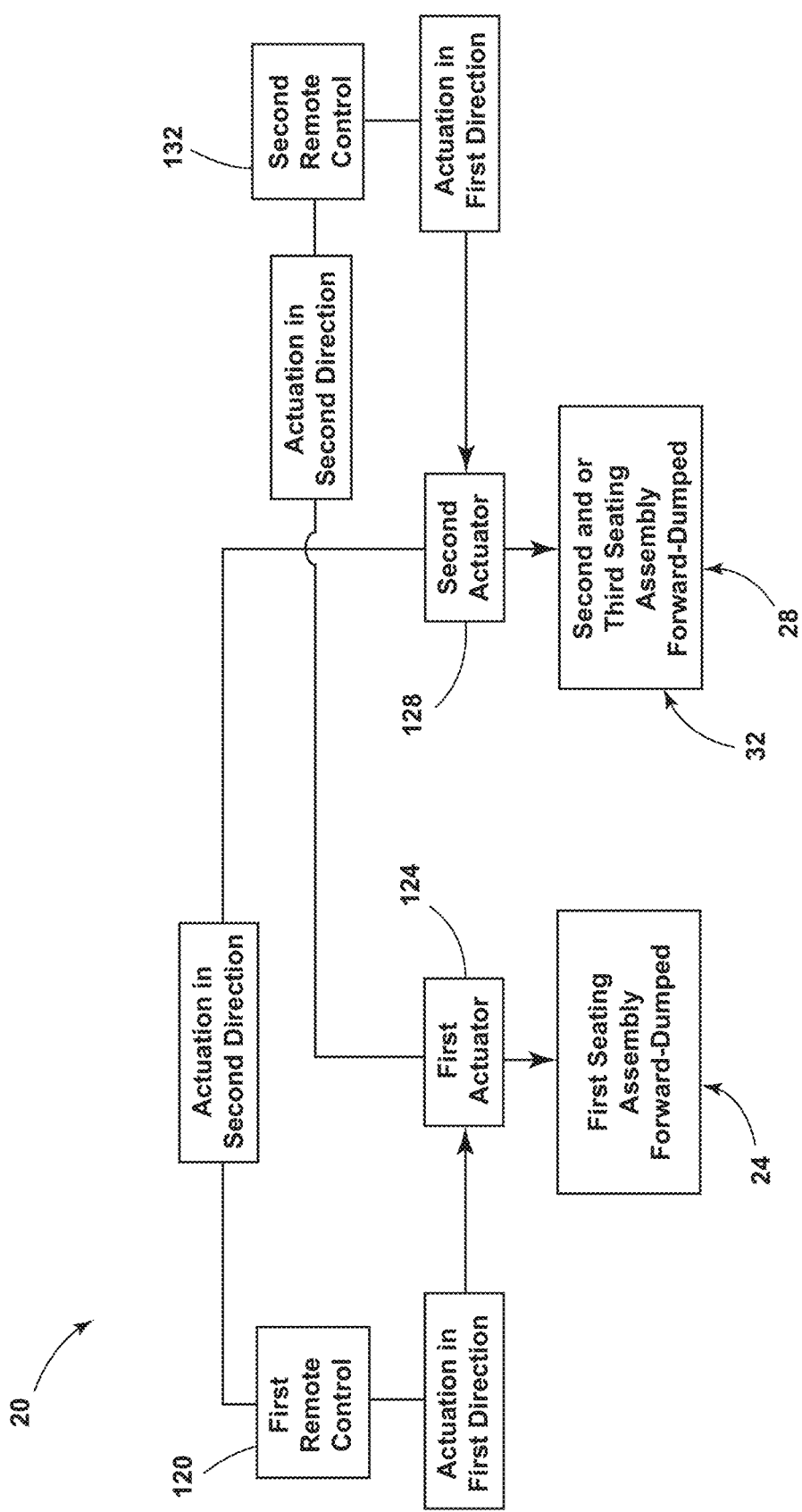
FIG. 6 is a schematic representation that depicts actuation of the various seating assemblies of the vehicle seating arrangement of the present disclosure, according to one example.

Referring now to FIG. 6, a schematic representation is shown that generically depicts actuation of the various seating assemblies of the vehicle seating arrangement 20 of the present disclosure from the use position to the forward-dumped position. The examples discussed herein that reference the cable 72 in the conduit 68 may be referred to as a manual example of the present disclosure. An electrical or powered example of the present disclosure is also possible. In the powered examples of the present disclosure, physical couplings of the various components may be substituted for electrical coupling between similar components. Of course, the electrical coupling between the various components may still represent a physical coupling between the components, however, the transmission of an actuation force on the remote control 44 is accomplished by way of an electrical signal to corresponding components rather than by an increasing in tension along the cable 72. As with the manual examples, the powered example of the present disclosure may be provided with one or more of the remote controls 44. In the depicted schematic, a first remote control 120 is electrically coupled with a first actuator 124. Actuation of the first remote control 120 in the first direction transmits a signal to the first actuator 124 that results in the first actuator 124 actuating the first lock assembly 52 from the locked position to the unlocked position. Accordingly, actuation of the first remote control 120 in the first direction results in the first actuator 124 inducing movement of the first seating assembly 24 from the use position to the forward-dumped position. It is contemplated that the first actuator 124 may be a motor such that the first actuator 124 performs the transition of the first seating assembly 24 from the use position to the forward-dumped position in a powered manner. Alternatively, the first actuator 124 may be similar to the actuator 108 in that the first actuator 124 places the first lock assembly 52 in the unlocked position at which point a biasing member, such as the clock spring 112, may act upon the seatback 40 of the first seating assembly 24 to place the first seating assembly 24 in the forward-dumped position.

Referring again to FIG. 6, the first remote control 120 is electrically coupled with a second actuator 128 that is coupled to the second lock assembly 56. Actuation of the first remote control 120 in the second direction transmits a signal to the second actuator 128 that results in the second actuator 128 actuating the second lock assembly 56 from the locked position to the unlocked position. Accordingly, actuation of the first remote control 120 in the second direction results in the second actuator 128 inducing movement of the second seating assembly 28 and/or the third seating assembly 32 from the use position to the forward-dumped position. It is contemplated that the second actuator 128 may be a motor such that the second actuator 128 performs the transition of the second seating assembly 28 and/or the third seating assembly 32 from the use position to the forward-dumped position in a powered manner. Alternatively, the second actuator 128 may be similar to the actuator 108 in that the second actuator 128 places the second lock assembly 56 in the unlocked position at which point a biasing member, such as the clock spring 112, may act upon the seatback 40 of the second seating assembly 28 and/or the third seating assembly 32 to place the second seating assembly 28 and/or the third seating assembly 32 in the forward-dumped position.

Referring further to FIG. 6, the vehicle seating arrangement 20 may also include a second remote control 132. The second actuator 128 is electrically coupled to the second remote control 132. In the depicted schematic, the second remote control 132 is electrically coupled with the second actuator 128. Actuation of the second remote control 132 in the first direction transmits a signal to the second actuator 128 that results in the second actuator 128 actuating the second lock assembly 56 from the locked position to the unlocked position. Accordingly, actuation of the second remote control 132 in the first direction results in the second actuator 128 inducing movement of the second seating assembly 28 and/or the third seating assembly 32 from the use position to the forward-dumped position. It is contemplated that the second actuator 128 may be a motor such that the second actuator 128 performs the transition of the second seating assembly 28 and/or the third seating assembly 32 from the use position to the forward-dumped position in a powered manner. Alternatively, the second actuator 128 may be similar to the actuator 108 in that the second actuator 128 places the second lock assembly 56 in the unlocked position, at which point a biasing member, such as the clock spring 112, may act upon the seatback 40 of the second seating assembly 28 and/or the third seating assembly 32 to place the second seating assembly 28 and/or the third seating assembly 32 in the forward-dumped position.

Referring still further to FIG. 6, the second remote control 132 is electrically coupled with the first actuator 124. Actuation of the second remote control 132 in the second direction transmits a signal to the first actuator 124 that results in the first actuator 124 actuating the first lock assembly 52 from the locked position to the unlocked position. Accordingly, actuation of the second remote control 132 in the second direction results in the first actuator 124 inducing movement of the first seating assembly 24 from the use position to the forward-dumped position. It is contemplated that the first actuator 124 may be a motor such that the first actuator 124 performs the transition of the first seating assembly 24 from the use position to the forward-dumped position in a powered manner. Alternatively, the first actuator 124 may be similar to the actuator 108 in that the first actuator 124 places the first lock assembly 52 in the unlocked position, at which point a biasing member, such as the clock spring 112, may act upon the seatback 40 of the first seating assembly 24 to place the first seating assembly 24 in the forward-dumped position. While the present disclosure has discussed an electronic or motorized example and a cable/conduit example, the present disclosure is not so limited. Rather, alternative approaches for executing the same functionality are envisioned. For example, enabling the transition of the seatback 40 from the use position toward the forward-dumped position may be accomplished by use of mechanical linkages, gear arrangements, hydraulic actuators, pneumatic actuators, as well as other conceivable approaches, including combinations of the examples disclosed herein.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle seating arrangement, comprising:
   a first seating assembly;
   a second seating assembly adjacent to the first seating assembly;
   a third seating assembly adjacent to at least one of the first seating assembly and the second seating assembly, with each of the first, second, and third seating assemblies comprising a seat and a seatback, wherein the seatbacks of each of the first, second, and third seating assemblies are pivotably coupled to their respective seats such that the seatbacks are each pivotable between a use position and a forward-dumped position; and
   a remote control positioned on at least one of the first seating assembly, the second seating assembly, and the third seating assembly, wherein actuation of the remote control in a first direction transitions the seatback of the first seating assembly from the use position toward the forward-dumped position, and wherein actuation of the remote control in a second direction transitions the seatback of at least one of the second and third seating assemblies from the use position toward the forward-dumped position.

2. The vehicle seating arrangement of claim 1, comprising:
   a linkage assembly that extends from the remote control to a first lock assembly that is coupled to the first seating assembly and from the remote control to a second lock assembly that is coupled to the third seating assembly.

3. The vehicle seating arrangement of claim 2, wherein actuation of the remote control in the first direction disengages the first lock assembly.

4. The vehicle seating arrangement of claim 3, wherein the linkage assembly comprises a first cable that extends between the remote control and the first lock assembly.

5. The vehicle seating arrangement of claim 4, wherein actuation of the remote control in the first direction increases a tension of the first cable such that a force applied to the remote control is transmitted into a force experienced by the first lock assembly, and wherein the force experienced by the first lock assembly actuates the first lock assembly from a locked position to an unlocked position.

6. The vehicle seating arrangement of claim 2, wherein actuation of the remote control in the second direction disengages the second lock assembly.

7. The vehicle seating arrangement of claim 6, wherein the linkage assembly comprises a second cable that extends between the remote control and the second lock assembly.

8. The vehicle seating arrangement of claim 7, wherein actuation of the remote control in the second direction increases a tension of the second cable such that a force applied to the remote control is transmitted into a force experienced by the second lock assembly, and wherein the force experienced by the second lock assembly actuates the second lock assembly from a locked position to an unlocked position.

9. The vehicle seating arrangement of claim 1, comprising:
   a first lock assembly provided at a junction between the seat and the seatback of the first seating assembly; and
   a second lock assembly provided at a junction between the seat and the seatback of the third seating assembly.

10. The vehicle seating arrangement of claim 9, wherein the first lock assembly comprises a first actuator that actuates the first lock assembly from a locked position to an unlocked position, and wherein the second lock assembly comprises a second actuator that actuates the second lock assembly from a locked position to an unlocked position.

11. The vehicle seating arrangement of claim 10, wherein the first actuator is electrically coupled to the remote control, and wherein actuation of the remote control in the first direction transmits a signal to the first actuator that results in the first actuator actuating the first lock assembly from the locked position to the unlocked position.

12. The vehicle seating arrangement of claim 11, wherein the second actuator is electrically coupled to the remote control, and wherein actuation of the remote control in the second direction transmits a signal the second actuator that results in the second actuator actuating the second lock assembly from the locked position to the unlocked position.

13. A vehicle seating arrangement, comprising:
   a first seating assembly;
   a second seating assembly adjacent to the first seating assembly;
   a third seating assembly adjacent to the second seating assembly and positioned such that the second seating assembly is positioned between the first and third seating assemblies, with each of the first, second, and third seating assemblies comprising a seat and a seatback, wherein the seatbacks of each of the first, second, and third seating assemblies are pivotably coupled to their respective seats such that the seatbacks are each pivotable between a use position and a forward-dumped position;
   a first remote control positioned on the first seating assembly, wherein actuation of the first remote control in a first direction transitions the seatback of the first seating assembly from the use position toward the forward-dumped position, and wherein actuation of the first remote control in a second direction transitions the seatbacks of the second and third seating assemblies from the use position toward the forward-dumped position; and a second remote control positioned on the third seating assembly, wherein actuation of the second remote control in a first direction transitions the seatback of at least one of the second and third seating assemblies from the use position toward the forward-dumped position, and wherein actuation of the second remote control in a second direction transitions the seatback of the first seating assembly from the use position toward the forward-dumped position.

14. The vehicle seating arrangement of claim 13, comprising:
a first linkage assembly that extends from the first remote control to a first lock assembly, the first lock assembly being coupled to the first seating assembly, and wherein the first linkage assembly extends from the first remote control to a second lock assembly, the second lock assembly being coupled to the third seating assembly; and
a second linkage assembly that extends from the second remote control to the first lock assembly, and wherein the second linkage assembly extends from the second remote control to the second lock assembly.

15. The vehicle seating arrangement of claim 14, wherein the first lock assembly is disengaged by either actuation of the first remote control in the first direction or actuation of the second remote control in the second direction.

16. The vehicle seating arrangement of claim 15, wherein the second lock assembly is disengaged by either actuation of the first remote control in the second direction or actuation of the second remote control in the first direction.

17. The vehicle seating arrangement of claim 13, comprising:
a first lock assembly provided at a junction between the seat and the seatback of the first seating assembly; and
a second lock assembly provided at a junction between the seat and the seatback of the third seating assembly.

18. The vehicle seating arrangement of claim 17, wherein the first lock assembly comprises a first actuator that actuates the first lock assembly from a locked position to an unlocked position, and wherein the second lock assembly comprises a second actuator that actuates the second lock assembly from a locked position to an unlocked position.

19. The vehicle seating arrangement of claim 18, wherein the first actuator is electrically coupled to the first and second remote controls, wherein actuation of the first remote control in the first direction transmits a signal to the first actuator that results in the first actuator actuating the first lock assembly from the locked position to the unlocked position, and wherein actuation of the second remote control in the second direction transmits a signal to the first actuator that results in the first actuator actuating the first lock assembly from the locked position to the unlocked position.

20. The vehicle seating arrangement of claim 19, wherein the second actuator is electrically coupled to the first and second remote controls, wherein actuation of the first remote control in the second direction transmits a signal to the second actuator that results in the second actuator actuating the second lock assembly from the locked position to the unlocked position, and wherein actuation of the second remote control in the first direction transmits a signal to the second actuator that results in the second actuator actuating the second lock assembly from the locked position to the unlocked position.

* * * * *